July 25, 1939.  W. HARFST  2,167,568
ELECTRICAL TIRE GAUGE
Filed March 27, 1937
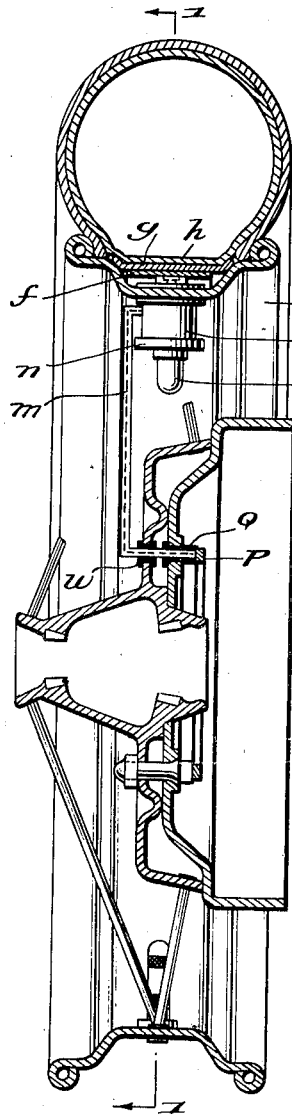
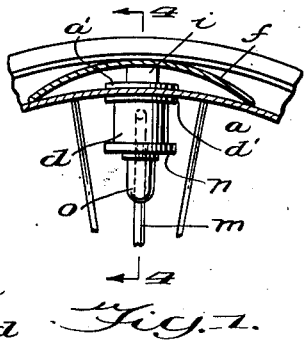
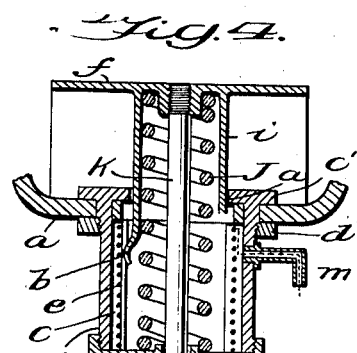
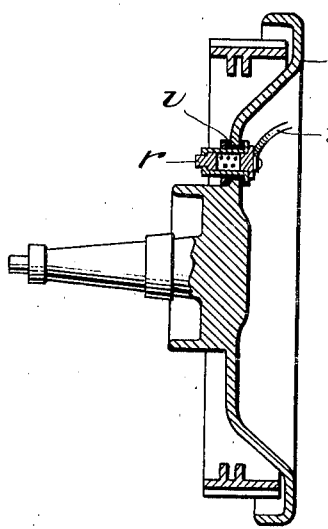
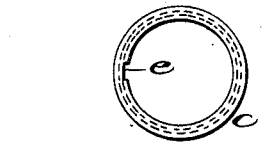
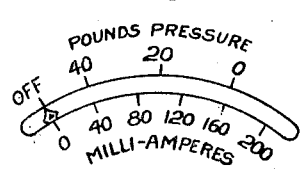
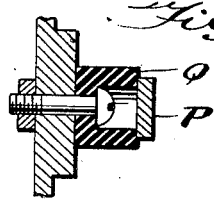
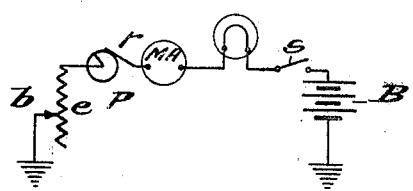
Inventor
Walter Harfst
By Vernon E. Hodges
H. Hamlin Hodges his Attorneys Patented July 25, 1939

2,167,568

UNITED STATES PATENT OFFICE 2,167,568

ELECTRICAL TIRE GAUGE

Walter Harfst, Grand Island, Nebr.

Application March 27, 1937, Serial No. 133,472

1 Claim. (Cl. 201—48)

My invention relates to an improvement in electrical tire gauges.

The object in mind is to provide a reliable means within view of the machine operator to indicate the air pressure in each tire at any time.

It consists in an electrical device which is connected with each tire rim and is constructed and adapted to be sensitive and responsive to the air pressure in the wheel tires, so that the driver may be forewarned of the condition of his tires.

In the accompanying drawing:

Fig. 1 is a fragmentary longitudinal section of a wheel and tire on line 1—1 of Fig. 2, showing my invention applied thereto;

Fig. 2 is an enlarged cross-section of the wheel;

Fig. 3 is a cross-section through the brake housing;

Fig. 4 is an enlarged section on line 4—4 of Fig. 1;

Fig. 5 is a top plan view of the resistance spool;

Fig. 6 is a wiring diagram;

Fig. 7 is a view of an indicating instrument; and

Fig. 8 is an enlarged fragmentary section through the collecting ring insulation support.

The letter $a$ represents a wheel rim, and $f$ is an arched spring having its ends resting within the channel of the rim as shown in Fig. 1. A guide shell $i$ integral therewith or attached thereto extends inwardly from its center as viewed in Fig. 4, and its inner end protrudes through the open outer end of the shell $d$, which latter is rigidly secured to the rim $a$. The shell $d$ and guide shell $i$ thus telescope and house an insulated spool $c$ of resistance wire. A bushing $c'$ is interposed between the spool $c$ and the inwardly projecting flange $a'$ at the outer end of the shell $d$. A nut $d'$ fastens the shell $d$ to the rim $a$.

The pin $k$ extends through the spring supporting bearing $n$ and screws into a threaded opening $l$ in the center of the arched spring $f$. A coil spring $j$ surrounds this pin $k$ and bears outwardly against the arch spring $f$ and the bearing $n$. A dust cap $o$ is screwed over the exposed head of the pin $k$.

Guide shell $i$ carries a spring contactor $b$, see Fig. 4, which traverses the resistance coil $e$, its position being determined by the pressure exerted by the air within the tube $h$ on the arch spring $f$ and the coil spring $j$.

A rubber strip $g$ is preferably placed between the arch-spring $f$ and the inner tube $h$ as shown in Fig. 2.

An electrical connector $m$ is properly insulated and extends from resistance coil $e$ through insulators $q$ and $w$ to the collecting ring $p$, which ring is mounted to revolve with the wheel.

The brush $r$ is spring-actuated and is slidably mounted in the insulating collar $v$ in the brake-housing $t$ and an electrical connector $u$ extends from the brush $r$ to a milliammeter.

In filling tube $h$ with air, it expands against and compresses arch-spring $f$ and the coil spring $j$, moving spring-contactor $b$ over resistance coil $e$, thereby allowing less current to flow through the milliammeter. The current passes from battery B, one pole of which is grounded through the milliammeter to brush $r$, to collecting ring $p$, through wire $m$, thence through resistance coil $e$, to spring contactor $b$ and is grounded through the wheel $a$, thus completing the circuit.

In Fig. 6, I have shown an incandescent light bulb connected in series with the milliammeter, so that the machine operator may readily know by seeing the light whether or not the gauge is in operation.

In Fig. 7, I have shown a diagrammatic representation of a milliammeter, the dial of which has been calibrated so that high amperage represents low air pressure, while low amperage represents high air pressure. In this way, at the time that pressure within the tube $h$ is high, the arched spring $f$ and the coil spring $j$ will be depressed, thus allowing the spring contactor $b$ to be in contact with the resistance coil $e$ in a position so that only a small amount of amperage may pass through the electrical circuit.

A switch $s$ is provided whereby electricity may be allowed to pass through the circuit when it is desired to ascertain the amount of pressure within a given tire. This switch $s$ may be opened to break the circuit if desired, so that energy from the battery B will not be used at a time that it is not necessary to have knowledge of the pressure within a tire.

It will be understood that while I have shown only one tire and wheel equipped with my electrical tire gauge, all of the wheels of an automobile may be equipped in the same manner, and may either utilize the same milliammeter or individual milliammeters.

While I have referred to the use of a milliammeter to serve as a registering device, it will be understood that any other form of registering device may be utilized without departing from the spirit of the invention.

I claim:

In an electrical tire gauge, the combination of a rim and tire of a wheel, telescopic shells supported by the rim and one of the shells extending into the tire where it responds to the pressure therein, a pin secured to one of the shells and slidably connected with the other, a spring housed within the shells tending normally to force them apart, a resistance housed within one shell, and a contactor carried by the other shell in position to engage the resistance at different points corresponding to the pressure in the tire.

WALTER HARFST.